United States Patent
Suresh et al.

(10) Patent No.: US 11,359,130 B2
(45) Date of Patent: Jun. 14, 2022

(54) METHODS OF ALTERING THE WETTABILITY OF SURFACES TO ENHANCE HYDROCARBON PRODUCTION

(71) Applicant: Baker Hughes Holdings LLC, Houston, TX (US)

(72) Inventors: Radhika Suresh, Sugar Land, TX (US); D. V. Satyanarayana Gupta, The Woodlands, TX (US); Valery Khabashesku, Houston, TX (US); Qusai Darugar, Houston, TX (US); Sankaran Murugesan, Katy, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/047,285

(22) PCT Filed: Apr. 10, 2018

(86) PCT No.: PCT/US2018/026963
§ 371 (c)(1),
(2) Date: Oct. 13, 2020

(87) PCT Pub. No.: WO2019/199289
PCT Pub. Date: Oct. 17, 2019

(65) Prior Publication Data
US 2021/0147743 A1 May 20, 2021

(51) Int. Cl.
| | | |
|---|---|---|
| *C09K 8/504* | (2006.01) | |
| *C09K 8/506* | (2006.01) | |
| *C09K 8/508* | (2006.01) | |
| *E21B 37/06* | (2006.01) | |
| *E21B 43/16* | (2006.01) | |

(Continued)

(52) U.S. Cl.
CPC ........... *C09K 8/5045* (2013.01); *C09K 8/506* (2013.01); *C09K 8/5086* (2013.01); *E21B 37/06* (2013.01); *E21B 43/16* (2013.01); *E21B 43/26* (2013.01); *C09K 2208/10* (2013.01)

(58) Field of Classification Search
CPC ...... C09K 2208/10; C09K 8/805; C09K 8/92; C09K 8/58; E21B 43/16; E21B 43/267; E21B 43/26
See application file for complete search history.

(56) References Cited

U.S. PATENT DOCUMENTS

| 6,983,801 B2 | 1/2006 | Dawson et al. |
|---|---|---|
| 9,434,874 B2 | 9/2016 | Qin et al. |

(Continued)

FOREIGN PATENT DOCUMENTS

| WO | 2018022554 A1 | 2/2018 | |
|---|---|---|---|
| WO | WO-2018022693 A1 * | 2/2018 | ............. C09K 8/665 |
| WO | 2020028375 A1 | 2/2020 | |

OTHER PUBLICATIONS

U.S. Appl. No. 16/672,161, filed Nov. 1, 2019.

(Continued)

*Primary Examiner* — Zakiya W Bates
(74) *Attorney, Agent, or Firm* — John Wilson Jones; Jones Delflache LLP

(57) ABSTRACT

A method of reducing water saturation onto surfaces exposed to hydrocarbons during the production of hydrocarbons from subterranean formations by altering the wettability of the surface of the formation with surface modified nanoparticles.

20 Claims, 1 Drawing Sheet

(51) Int. Cl.
*E21B 43/26* (2006.01)
*E21B 43/22* (2006.01)

(56) References Cited

U.S. PATENT DOCUMENTS

| | | | |
|---|---|---|---|
| 9,518,213 | B2 | 12/2016 | Gupta et al. |
| 9,562,188 | B2 | 2/2017 | Monroe et al. |
| 9,683,431 | B2 | 6/2017 | Lant et al. |
| 9,701,892 | B2 | 6/2017 | Monroe et al. |
| 9,822,621 | B2 | 11/2017 | Lant et al. |
| 10,047,280 | B2 | 4/2018 | Monroe et al. |
| 10,227,846 | B2 | 3/2019 | Monroe et al. |
| 2016/0362594 | A1 | 12/2016 | Rojas et al. |
| 2020/0231866 | A1 | 7/2020 | Sodi et al. |
| 2020/0299560 | A1 | 9/2020 | Bhaduri et al. |

OTHER PUBLICATIONS

De Ferri, L., et al., "Study of silica nanoparticles—polysiloxane hydrophobic treatments for stone-based monument protection," Journal of Cultural Heritage, dated Feb. 22, 2011, DOI: 10.16/j.culher.2011.02.006, believed same as retrieved on Mar. 14, 2011, vol. 12, No. 4, pp. 356-363.

Manoudis, P.N., et al. "Fabrication of super-hydrophobic surfaces for enhanced stone protection," Surface and Coatings Technology, dated Feb. 25, 2009, DOI: 10.1016/j.surfcoat.2008.10.041, vol. 203, No. 10-11, pp. 1322-1328.

Li, D., et al., "The effect of adding PDMS-OH and silica nanoparticles on sol-gel properties and effectiveness in stone protection," Applied Surface Science, dated Feb. 1, 2013, DOI: 10.1016/j.apsusc.2012.12.030, vol. 266, pp. 368-374.

Luo, M., et al., "Performance Evaluation of Water Control with Nanoemulsion as Pre-pad Fluid Hydraulically Fracturing Tight Gas Formations," Energy Fuels, dated Feb. 23, 2017, DOI: 10.1021/acs.energyfuels.6b03291, vol. 41, No. 4, pp. 3698-3707.

International Search Report of the International Searching Authority for PCT/US2018/026963 dated Aug. 29, 2018.

\* cited by examiner

METHODS OF ALTERING THE WETTABILITY OF SURFACES TO ENHANCE HYDROCARBON PRODUCTION

FIELD OF THE INVENTION

The disclosure relates to methods of reducing water saturation onto surfaces exposed to hydrocarbons during the production of hydrocarbons from subterranean formations. In an embodiment, the disclosure relates to enhancing the production of hydrocarbons from a subterranean formation by altering the wettability of the surface of the formation with hydrophobically and/or oleophobically surface modified nanoparticles. In another embodiment, the disclosure relates to a hydrophobic and/or oleophobic well treating compositions. In another embodiment, the disclosure relates to metallic tools and pipes having a hydrophobically and/or oleophobically modified surface.

BACKGROUND OF THE INVENTION

During the life of an oil or gas well, the wetting properties of surfaces of the subterranean formation which are penetrated by the well may change dramatically. The degree of wettability of the surface of the formation may significantly reduce the relative permeability of the formation to hydrocarbons. Further, the wettability of the surface may have a profound effect on liquid displacement of hydrocarbons within the well.

In sandstone formations, the ideal surface state for hydrocarbon production is water-wet with very low water saturation. If water saturation increases in the formation, pore throats narrow and restrict hydrocarbon flow. This results in a decrease in hydrocarbon production. Formations rich in swellable and migrating clays are also water sensitive due to the presence of kaolinite, chlorite, illite and mixed layers of illite and smectite. Water retention issues may be especially acute in tight gas formations. When exposed to aqueous based fluids, such water-wet formations trap water for extended periods, if not permanently. This is especially the case in the near-wellbore region of the well.

Generally, the amount of oil and/or gas that may be ultimately recovered from the well is decreased by an excessive amount of water-wetness of the surface of the formation since the water takes the place of other fluids that may flow or be lifted from the well. An excessive amount of water-wetness may thus reduce permeability to hydrocarbons, adversely affect hydrocarbon production, reduce the productivity of the well and increase the cost of producing hydrocarbons from the well.

In the past, keeping the surface of the formation at an appropriate water-wet state to improve movement of hydrocarbons has required pumping of a strong water-wet surfactant. The surfactant is then adsorbed onto the surfaces reducing the capillary pressure and water saturation within the porous systems. This is, however, not a permanent solution, as the surfactant is washed out over time. Alternatives have therefore been sought which provide greater permanency.

SUMMARY OF THE INVENTION

In an embodiment, the disclosure relates to methods of imparting hydrophobicity to a surface exposed to hydrocarbons during the production of hydrocarbons from subterranean formations.

In an embodiment, hydrophobicity may be imparted to a surface exposed to hydrocarbons during the production of hydrocarbons from a well by exposing the surface to surface modified nanoparticles, the nanoparticles being selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof and wherein the nanoparticles have been treated with a hydrophobic and/or oleophobic surface modifying treatment agent selected from the group consisting of (i) organosilicon materials, (ii) fluorinated organic acids or a reactive derivative; (iii) linear or branched alkyl organic acids or a reactive derivative, (iv) substituted alkyl organic acids or a reactive derivative, (v) aryl or substituted aryl organic acids or a reactive derivative and (vi) mixtures thereof.

In an embodiment, hydrophobicity may be imparted to a surface exposed to hydrocarbons during the production of hydrocarbons by (a) first attaching nanoparticles to the surface of the subterranean formation by pumping into the well a first fluid containing the nanoparticles; and (b) second attaching a hydrophobic and/or oleophobic surface treating agent to the nanoparticles which are attached to the surface of the formation by pumping into the well a second fluid containing the hydrophobic and/or oleophobic surface treating agent.

In another embodiment, hydrophobicity may be imparted to a surface exposed to hydrocarbons during the production of hydrocarbons by pumping a composite into a well penetrating the subterranean formation. The substrate of the composite are nanoparticles. A hydrophobic and/or oleophobic surface modifying agent is attached onto at least a portion of the surface of the substrate to form the composite.

In another embodiment, hydrophobicity may be imparted to a surface exposed to hydrocarbons during the production of hydrocarbons by first coating nanoparticles onto at least a portion of a tool or pipe exposed to hydrocarbons during production of the hydrocarbons from the subterranean formation. Prior to introduction of the tool or pipe into the well, hydrophobic and/or oleophobic surface modifying treatment agents are attached onto the nanoparticles.

The disclosure further relates to methods of reducing water saturation on surfaces exposed to hydrocarbons during the production of hydrocarbons from subterranean formations by exposing the hydrocarbons to surface modified nanoparticles, the nanoparticles being selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof and wherein the nanoparticles have been treated with a hydrophobic and/or oleophobic surface modifying treatment agent selected from the group consisting of (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; (v) aryl or substituted aryl organic acids and reactive derivatives thereof; and (vi) mixtures of (i), (ii), (iii), (iv) and (v).

In another embodiment, water saturation on surfaces exposed to hydrocarbons during the production of hydrocarbons may be reduced by pumping into the well a first fluid containing the nanoparticles. A second fluid may then be pumped into the well, the second fluid containing a hydrophobic and/or oleophobic surface treating agent. The hydrophobic and/or oleophobic surface treating agent may attach to the nanoparticles attached to the surface of the subterranean formation.

In an embodiment, a method of reducing water saturation on surfaces exposed to hydrocarbons during the production of hydrocarbons is provided by pumping a composition into a well penetrating the subterranean formation and contacting the surfaces with the composition. The composition may include a composite comprising nanoparticles (substrate) having a hydrophobic and/or oleophobic surface modifying agent attached onto at least a portion of the surface of the substrate.

In another embodiment, a method of altering the wettability of a surface of a subterranean formation exposed to hydrocarbons during the production of hydrocarbons from the subterranean formation is provided. In this method, the surface of the subterranean formation is exposed to nanoparticles having a hydrophobic and/or oleophobic surface modifying treatment agent attached onto at least a portion of the surface of the nanoparticles. The surface modifying treatment agent may be selected from one or more of (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; and (v) aryl or substituted aryl organic acids and reactive derivatives thereof. The surface of the subterranean formation may be exposed to the surface modified nanoparticles for a period of time sufficient to render the surface of the subterranean formation neutrally wet.

Another embodiment of the disclosure relates to a method of treating a subterranean formation penetrated by a well by first pumping into the well a fluid comprising nanoparticles and attaching the nanoparticles to a surface of the subterranean formation. The nanoparticles may be silica, silicic acid, aluminum oxides, aluminum hydroxides, aluminum hydroxyoxides, aluminosilicates, zirconium oxides, zirconium hydroxides, zirconium hydroxyoxides or a mixture thereof. The crystallized size of the nanoparticles may be less than or equal to 100 nm. A fluid comprising a surface modifying agent is then pumped into the well and the surface modifying agent is coated onto at least a portion of the surface of the nanoparticles to form hydrophobically and/or oleophobically surface modified nanoparticles. The surface modifying agent may be selected from (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; (v) aryl or substituted aryl organic acids and reactive derivatives thereof; and (vi) mixtures of (i), (ii), (iii), (iv) and (v). In an embodiment, the organic acid may be a carboxylic acid, sulfonic acid, phosphoric acid, phosphonic acid as well as a phosphinic acid.

In another embodiment, the surface modifying agent may be free of fluorine. The contact angle between the hydrophobically and/or oleophobically surface modified nanoparticles attached to the surface of the formation and hydrocarbon formation fluids may be greater than or equal to 60°. The contact angle between the hydrophobically and/or oleophobically surface modified nanoparticles attached to the surface of the formation and the aqueous formation fluid may be greater than or equal to 105°.

In another embodiment, a method of treating a subterranean formation penetrated by a well is provided wherein an aqueous or non-aqueous dispersion comprising dispersed nanoparticles is first pumped into the well. The dispersion has a Zeta potential. The dispersed nanoparticles attach to a surface of the subterranean formation. A fluid comprising a hydrophobic and/or oleophobic surface modifying agent is then pumped into the well. The hydrophobic and/or oleophobic surface modifying agent may be an organosilicon material, a fluorinated organic acid or a reactive derivative thereof, a linear or branched alkyl organic acid or a reactive derivative thereof, a substituted alkyl organic acid or a reactive derivative thereof, an aryl or substituted aryl organic acid or a reactive derivative thereof or mixture of any of these agents. The hydrophobic and/or oleophobic surface modifying agent is coated onto at least a portion of the surface of the nanoparticles to form surface modified nanoparticles. The contact angle between the surface modified nanoparticles attached to the formation and the aqueous formation fluid is greater than or equal to 105° and the contact angle between the surface modified nanoparticles attached to the formation and the hydrocarbon formation fluid is greater than or equal to 60°. The surface of the subterranean formation may be more rough after the surface modified nanoparticles are attached to the surface than before the surface modified nanoparticles are attached to the surface. The surface tension of the surface of the subterranean formation may be less after the surface modified nanoparticles are attached to the surface than before the surface modified nanoparticles are attached to the surface.

In another embodiment, a method of treating a subterranean formation is provided wherein an aqueous dispersion having dispersed nanoparticles is pumped into a well penetrating the formation. The dispersion has a Zeta potential. The dispersed nanoparticles attach to a surface of the formation. A fluid comprising a hydrophobic and/or oleophobic surface modifying agent is then pumped into the well and is coated onto at least a portion of the surface of the nanoparticles to form hydrophobically and/or oleophobically surface modified nanoparticles. The surface modifying agent may be (i) an organosilicon material; (ii) a fluorinated organic acid or a reactive derivative thereof; (iii) a linear or branched alkyl organic acid or a reactive derivative thereof; (iv) a substituted alkyl organic acid or a reactive derivative thereof; (v) an aryl or substituted aryl organic acid or a reactive derivative thereof; and (vi) mixtures thereof.

In another embodiment, a composite for treating a well is provided. The composite has a substrate of charged nanoparticles having a diameter less than or equal to 100 nm. Suitable charged nanoparticles include silica, silicic acid, aluminum oxides, aluminum hydroxides, aluminum hydroxyoxides, aluminosilicates, zirconium oxides, zirconium hydroxides, zirconium hydroxyoxides and mixtures thereof. The composite further contains a hydrophobic and/or oleophobic surface modifying agent which is attached onto at least a portion of the surface of the substrate of the charged nanoparticles. The hydrophobic and/or oleophobic surface modifying agent may be selected from organosilicon materials; fluorinated organic acids or reactive derivatives thereof; linear or branched alkyl organic acids or reactive derivatives thereof; substituted alkyl organic acids or reactive derivatives thereof; aryl or substituted aryl organic acids or reactive derivatives; and mixtures of any of these agents. In an embodiment, the surface modifying agent is non-fluorinated.

In another embodiment, a composite for treating a well is provided which contains a substrate and a hydrophobic and/or oleophobic surface modifying treatment agent coated onto at least a portion of the substrate. The substrate contains hydrophilic charged nanoparticles having a diameter between from about 10 nm to about 100 nm. Suitable charged nanoparticles include silica, silicic acid, aluminum oxides, aluminum hydroxides, aluminum hydroxyoxides, aluminosilicates, zirconium oxides, zirconium hydroxides, zirconium hydroxyoxides and mixtures thereof. Suitable hydrophobic and/or oleophobic surface modifying agents include (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; (v) aryl or substituted aryl organic acids and reactive derivatives thereof; and (vi) mixtures of any of (i), (ii), (iii), (iv) and (v).

Another embodiment of the disclosure relates to a method of treating a subterranean formation penetrated by a well by pumping into the well a fluid comprising one or more composites having a substrate and a hydrophobic and/or oleophobic surface modifying treatment agent coated onto at least a portion of the substrate. The substrate contains hydrophilic charged nanoparticles which may include silica, silicic acid, aluminum oxides, aluminum hydroxides, aluminum hydroxyoxides, aluminosilicates, zirconium oxides, zirconium hydroxides, zirconium hydroxyoxides and mixtures thereof. Suitable hydrophobic and/or oleophobic surface modifying agents include organosilicon materials; fluorinated organic acids and reactive derivatives thereof; linear or branched alkyl organic acids and reactive derivatives thereof; substituted alkyl organic acids and reactive derivatives thereof; aryl or substituted aryl organic acids and reactive derivatives thereof; and mixtures of any of these agents. At least a portion of the composite is attached onto the surface of the subterranean formation. The contact angle between the composite attached onto the surface of the subterranean formation and the aqueous formation fluid may greater than or equal to 105°. The contact angle between the composite attached onto the surface of the subterranean formation and the hydrocarbon formation fluid may be greater than or equal to 60°.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
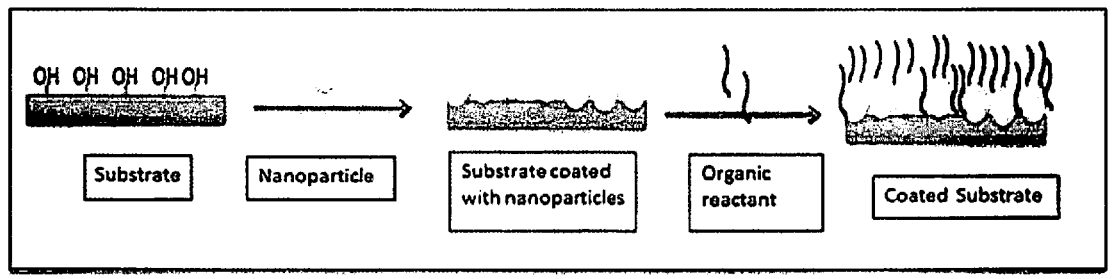
FIG. 1 illustrates a method of imparting hydrophobicity to a hydrophilic surface by first attaching nanoparticles to the surface and then modifying the substrate with a hydrophobic and/or oleophobically surface modifying treating agent.

Characteristics and advantages of the present disclosure and additional features and benefits will be readily apparent to those skilled in the art upon consideration of the following detailed description of exemplary embodiments and referring to the accompanying figure. It should be understood that the description herein and appended figure, being of exemplary embodiments, is not intended to limit the claims of this patent or any patent or patent application claiming priority hereto.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Each numerical value may be read as being modified by the term "about" as well as being read by not being modified by the term "about". It is intended that a range listed or described as being useful, suitable, or the like, includes each and every number within the range, including the end points. For example, "a range of from 1 to 10" is to be read as indicating each and every possible number along the continuum from about 1 to about 10. Thus, even if specific data points within the range are explicitly identified or refer to only a few specific data points, it is to be understood that each and all data points defined by the range are considered to have been specified.

The methods disclosed herein impart hydrophobicity and/or oleophobicity to surfaces to which hydrocarbons may be exposed during their production from a subterranean formation.

The subterranean formation may be a siliceous formation, such as sandstone, as well as a metal oxide containing formation, including carbonate formations. The formation may be enriched in clay and the metal oxide may include alumina.

The methods disclosed herein may further enable a hydrophilic surface, such as a hydrophilic surface of a subterranean formation, to be modified to a hydrophobic and/or oleophobic surface. The methods further enable hydrocarbons to be exposed to hydrophobic and/or oleophobic versus hydrophilic surfaces during their production in the well.

The methods further provide a method for altering the wettability of a surface within a well to which produced hydrocarbons are exposed. In an embodiment, the water wetness property of a surface may be altered by modifying the surface with the hydrophobically and/or oleophobically surface modified nanoparticles described herein.

The methods disclosed herein may consist of pumping into the well a composition containing nanoparticles surface modified with hydrophobic and/or oleophobic treating agents. Such compositions may be characterized as a composite of nanoparticles as the substrate and the hydrophobic and/or oleophobic treating agent attached (directly or indirectly) onto at least a surface of the substrate. Hydrophilic surfaces within the well may be readily rendered hydrophobic and/or oleophobic with the surface modified nanoparticles by attachment of the composites onto at least a portion of the hydrophilic surface.

Further, the methods disclosed herein may consist of pumping a first fluid into the well containing the described nanoparticles followed by a second fluid containing a hydrophobic and/or oleophobic treating agent. Functionalization of the nanoparticles with the hydrophobic and/or oleophobic treating agent occurs at in-situ conditions. The hydrophobic and/or oleophobic surface treating agent attached to the nanoparticles renders at least a portion of the surface of a formation hydrophobic and/or oleophobic.

Surfaces exposed to hydrocarbons during hydrocarbon production are rendered hydrophobic and/or oleophobic by functionalization of nanoparticles. The nanoparticles attach to the surface, typically the nanoparticles are directly attached to the surface. Without being bound to any theory, it is believed the nanoparticles are covalently bonded to the surface. The surface modifying treatment agents are attached to the nanoparticles such that the hydrophobic and/or oleophobic groups of the treatment agents are exposed to hydrocarbon formation fluids as well as aqueous formation fluids in the well. In a preferred embodiment, the surface modifying treatment agent is directly attached to the nanoparticles. The surface modifying treatment agent thus modifies a hydrophilic surface to be hydrophobic and/or oleophobic.

In an embodiment, water saturation of a surface within the well may be altered by modifying the surface with the hydrophobically and/or oleophobically surface modified nanoparticles. Permeability of the formation may be enhanced by controlling the degree of water saturation of the surface of the formation by modifying the surface with the hydrophobically and/or oleophobically surface modified nanoparticles. For instance, since increased water saturation may decrease the permeability of a formation, reducing the amount of saturated water in the formation by attaching the hydrophobically and/or oleophobically surface modified nanoparticles to the surface of the formation may enhance relative permeability.

Attachment of the surface modified nanoparticles to the surface to render the surface hydrophobic and/or oleophobic may further alter the surface energy of the formation being treated. Use of the nanoparticles for attachment to the surface makes the surface of the formation more rough (or less smooth). Low surface energy is imparted to the surface by the hydrophobic and/or oleophobic treating agent. The result is the in-situ functionalization of the surface of the formation. The methods described herein may be viewed as a procedure for mimicking the Lotus effect, a wettability phenomenon, downhole. The Lotus effect requires surface roughness and a low surface energy component. The hydrophobic and/or oleophobic surface modified nanoparticles alter (lower) the surface energy of the formation. Functionalization of the surface of the formation permanently and positively affects the movement of fluids through the formation while decreasing water saturation. Conductivity of the formation to water and oil is improved.

Figure 2:
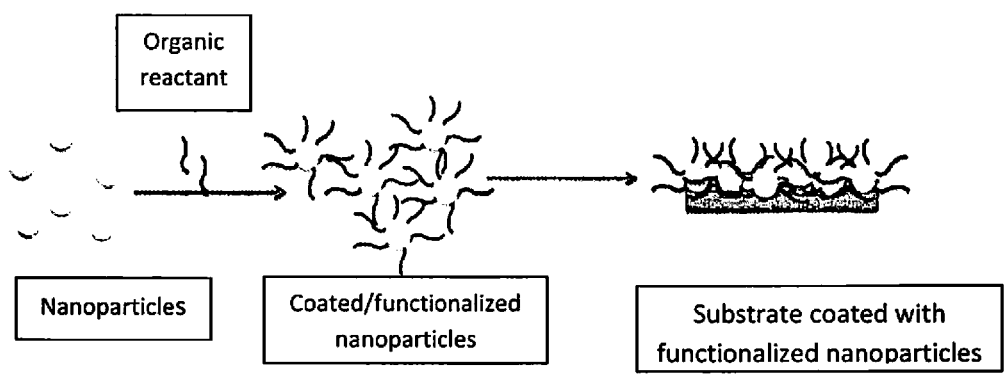
FIG. 2 illustrates a method of imparting hydrophobicity to a hydrophilic surface by attaching nanoparticles functionalized with an organic reactant onto a hydrophilic substrate.

FIGS. 1 and 2 illustrate two different methods of rendering hydrophobicity to a hydrophilic surface. In both methods, the surface of the formation is less smooth (more rough) after attachment of the surface modified nanoparticles. This may be attributable to the combination of the nanoparticles and the low energy surface groups provided by the hydrophobic and/or oleophobic surface treating agent.

Referring to FIG. 1, the surface modified nanoparticles may be formed under in-situ conditions. As illustrated, the nanoparticles may be first applied onto the surface of the substrate. The surface of the substrate may be first modified to have a positive or negative charge prior to application of the nanoparticles onto the surface. (Surfaces of substrates like silica and alumina may also have exposed hydroxyl groups.) The surface of the nanoparticles may also be charged, if desired. Imparting a surface charge to the nanoparticles may enhance binding of the nanoparticles onto the hydrophilic surface.

After the hydrophilic surface is at least partially coated with the nanoparticles, a second fluid may be introduced containing the hydrophobic and/or oleophobic surface treating agent. The surface treating agent is shown as attaching (at least partially) to the surface of the nanoparticles as well as onto the surface of the hydrophilic substrate through surface hydroxyl groups. The hydrophobic and/or oleophobic portion of the surface treating agent is then exposed to hydrocarbon fluids as well as aqueous fluids within the formation.

An advantage of the method illustrated in FIG. 1 is a higher likelihood of adhesion of the nanoparticles to the hydrophilic surface by the surface modified nanoparticles. Adhesion of the surface modified nanoparticles to the hydrophilic surface is further enhanced through the hydroxyl groups on the hydrophilic substrate. When the surface of the nanoparticles is further charged, adhesion is also improved.

FIG. 2 illustrates an alternative method of imparting hydrophobicity to a hydrophilic surface wherein nanoparticles functionalized with the hydrophobic and/or oleophobic surface treating agent are attached onto at least a portion of the hydrophilic surface. As illustrated, the nanoparticles may be first coated with the hydrophobic and/or oleophobic surface modifying treatment agent. A fluid containing the functionalized nanoparticles may then be introduced to the hydrophilic surface.

When used to treat a subterranean formation, the contact angle between the surface modified nanoparticles attached to the formation and the aqueous fluid in the formation is greater than or equal to 105°, and is often greater than or equal to 150° and in some cases greater than or equal to 175°. The contact angle is a measure of hydrophobicity. Typically, a liquid is considered to be "non-wet" or hydrophilic when the contact angle is less than 90° and "non-wetting" or hydrophobic when the contact angle is greater than 90°. A surface having a water contact angle greater than 150° is usually termed "ultra-hydrophobic" or "super-hydrophobic" characterizing a water-repellant surface. A super-hydrophobic surface may have a contact angle hysteresis less than 10°; in some cases, less than 5°. When the contact angle is less than 90°, the wetting tendency of the surface modified substrate may become greater when the substrate is rough versus smooth. When the contact angle is greater than 90°, the substrate may repel more when the substrate is rough. Thus, the high contact angle is indicative of the super-hydrophobic nature of the substrate of the formation after treatment with the surface modified nanoparticles.

Further, when used to treat a subterranean formation, the contact angle between the surface modified nanoparticles attached to the formation and the hydrocarbon fluid in the formation is greater than or equal to 60°, usually greater than or equal to 75° and in some cases greater than or equal to 90°. A contact angle above 60° is indicative of the oleophobic nature of the substrate of the formation after treatment with the surface modified nanoparticles.

The methods disclosed herein may further enable a hydrophilic surface, such as a hydrophilic surface of a subterranean formation, to be modified to a hydrophobic and/or oleophobic surface. The methods further enable hydrocarbons to be exposed to hydrophobic and/or oleophobic versus hydrophilic surfaces during their production in the well.

In a preferred embodiment, the surface modified nanoparticles may be used to alter the wettability of a surface of the reservoir. In an embodiment, the water wetness property of a surface may be altered by modifying the surface with the hydrophobically and/or oleophobically surface modified nanoparticles described herein. For instance, treatment of the surface of the formation with the surface modified nanoparticles may make the surface of the formation neutrally wet. In contrast to fully water wet surfaces wherein water occupies small pores and contracts the majority of the rock surface and fully oil wet surfaces where the position of fluid is reversed such that oil occupies the smaller pores and spreads over the majority of the rock (while the water occupies the larger pores), the surface modified nanoparticles may provide a neutrally wet surface which has no preference for either oil or water.

Exemplary nanoparticles include those set forth in U.S. Pat. No. 9,518,213, herein incorporated by reference.

The nanoparticles preferably comprise any type of aluminum oxide, hydroxide or hydroxyoxide. Examples include alumina and boehmite. Other suitable materials include zirconium oxides and hydroxides, such as zirconia. In a preferred embodiment, the nanoparticles comprise at least one material chosen from aluminum oxides, aluminum hydroxides, aluminum hydroxyoxides, aluminosilicates, zirconium oxides, zirconium hydroxides and zirconium hydroxyoxides. The nanoparticles can have a concentration of aluminum oxides, hydroxides and hydroxyoxides or zirconium oxides, hydroxides and hydroxyoxides of greater than 50% by weight of the total weight of the nanoparticles.

Typically, the size of the nanoparticles can be less than 100 nm in diameter, such as about 5 to about 50 nm, or about 9 nm to about 25 nm in diameter.

When produced in-situ, the nanoparticles can be applied onto a surface as dispersants in an aqueous or non-aqueous dispersion. When applied onto a surface in the form of a dispersion, the dispersed size of the nanoparticles typically can range from about 50 to about 500 nanometers in diameter, such as about 100 to about 250 nm.

The concentration of the nanoparticles in the fluid applied onto the surface is typically greater than 0.5% (about 41.7 pounds per thousand gallons ("pptg")) by weight based on the total weight of the fluid. For example, the concentration of nanoparticles can range from about 2% to about 20% by weight (about 167 pptg to about 1670 pptg).

The nanoparticles when pumped into the well as a fluid may carry a charge that results in an electric potential in the dispersion, otherwise known as Zeta potential. All values for Zeta potential in the present disclosure are in units of millivolts, unless otherwise stated.

The Zeta potential of the dispersion can be varied in order to control the viscosity of the fluid pumped into the well. The viscosity of the fluid increases with decreasing Zeta potential. Increases in viscosity vary depending on, among other things, the type and concentration of nanoparticles in the fluid and the pH of the fluid. The viscosity of the fluid can thus be controlled by increasing or decreasing the Zeta potential.

Examples of suitable methods for adjusting Zeta potential of the fluids include controlling the pH of the fluid and adding surfactants and/or esters to the fluid. Controlling the pH can be performed by adding a pH adjuster to the well servicing fluid. Examples of pH adjusters include commonly used acids and bases, buffers and mixtures of acids and bases. For example, caustic (e.g., NaOH, KOH or $Ca(OH)_2$), sodium bicarbonate, potassium carbonate, and sodium carbonate can be employed. Examples of acids that can be used include hydrochloric acid, acetic acid, citric acid, formic acid, fumaric acid, and sulfamic acid. The range of pH of the fluid can be any suitable range, such as about 2 to about 14.

Examples of suitable esters that can also be employed to shift the Zeta potential include esters of polycarboxylic acid, such as an ester of oxalic, malonic, succinic, malic, tartaric, citric, phthalic, ethylenediamine tetraacetic (EDTA), nitrilotriacetic and other carboxylic acids. Examples of a suitable ester compounds include citrates, such as acetyl triethyl citrate, oxalates, and ethylenediamine tetraacetates, as described in U.S. Pat. No. 6,983,801, herein incorporated by reference. Esters are known for providing a delayed reduction in viscosity due to the relatively slow hydrolysis of the ester. The products of hydrolysis include polycarboxylate anions that can affect the ionic strength and/or pH of the fluid, and thereby shift the Zeta potential back to provide a desired reduced viscosity.

Any other suitable pH adjusters that can react slowly with water to produce acid, where the reaction occurs slowly enough to provide a suitable delay, can also be employed. In addition to esters, such compounds can include acid anhydrides and lactones, such as 4,4'-oxydiphthalic anhydride and $\gamma$-butyrolactone. Polymeric acid anhydrides and polymeric hydroxycarboxylic acids are also useful.

Suitable surfactants can include any non-ionic, anionic, cationic or amphoteric surfactants that change the Zeta potential. Examples of suitable anionic surfactants include alkyl, aryl or alkyl aryl sulfates, alkyl, aryl or alkyl aryl carboxylates or alkyl, aryl or alkyl aryl sulfonates. In an embodiment, the alkyl moieties can have about 1 to about 18 carbons, the aryl moieties can have about 6 to about 12 carbons, and the alkyl aryl moieties can have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates. Examples include alkyl ether sulfates, alkaryl sulfonates, alkyl succinates, alkyl sulphosuccinates, N-alkoyl sarcosinates, alkyl phosphates, alkyl ether phosphates, alkyl ether carboxylates, alpha-olefin sulfonates and acyl methyl taurates, such as their sodium, magnesium ammonium and mono-, di- and triethanolamine salts. The alkyl and acyl groups can contain, for example, from 8 to 18 carbon atoms and can be unsaturated. The alkyl ether sulfates, alkyl ether phosphates and alkyl ether carboxylates can contain, for example, from one to 10 ethylene oxide or propylene oxide units per molecule, such as 2 to 3 ethylene oxide units per molecule. Examples of suitable anionic surfactants include sodium lauryl sulfate, sodium lauryl ether sulfate, ammonium lauryl sulphosuccinate, ammonium lauryl sulfate, ammonium lauryl ether sulfate, sodium dodecylbenzene sulfonate, triethanolamine dodecylbenzene sulfonate, sodium cocoyl isethionate, sodium lauroyl isethionate, and sodium N-lauryl sarcosinate. Examples of suitable cationic surfactants include, for example, quaternary ammonium surfactants of the formula $X^- N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl groups having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. In an embodiment, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Other examples of surfactants can include betaines, sultaines and hydroxysultaines, or amine oxides. Examples of betaines include the higher alkyl betaines, such as coco dimethyl carboxymethyl betaine, lauryl dimethyl carboxymethyl betaine, lauryl dimethyl α-carboxyethyl betaine, cetyl dimethyl carboxymethyl betaine, cetyl dimethyl betaine, lauryl bis-(2-hydroxyethyl)carboxymethyl betaine, oleyl dimethyl-ɣ-carboxypropyl betaine, lauryl bis-(2-hydroxypropyl)alpha-carboxyethyl betaine, coco dimethyl sulfopropyl betaine, lauryl dimethyl sulfoethyl betaine, lauryl bis-(2-hydroxyethyl)sulfopropyl betaine, amidobetaines and amidosulfobetaines (wherein the $RCONH(CH_2)_3$ unit is attached to the nitrogen atom of the betaine, oleyl betaine, and cocamidopropyl betaine. Examples of sultaines and hydroxysultaines include materials such as cocamidopropyl hydroxysultaine.

Different formations can have different needs in terms of the optimum viscosity and sheer thinning properties of the fluid. The ability to adjust Zeta potential and thereby match the viscosity of the fluid to best suit the needs of a given formation. The ability to adjust the viscosity of a fluid by shifting the Zeta potential using nanoparticles, as described herein, can also allow tailoring of the viscosity in order to provide fluid properties best suited for any given formation.

Modifying the pH to vary the Zeta potential of the fluid can also be employed to increase the contact angle and reduce interfacial tension between the fluid and the formation. Increasing the contact angle can make it easier to recover produced hydrocarbons form the formation.

During the process, surface tension is reduced. The surface tension of the surface of a formation is less after the surface modified nanoparticles are attached to the surface than before the surface modified nanoparticles are attached to the surface. Surfactants are not necessary for lowering the surface tension and increasing the contact angle.

Any suitable process for mixing the nanoparticles, aqueous base and other components of the fluid can be used. For example, after the nanoparticles are added to a certain amount of aqueous base to form the fluid, the fluid can be pumped into the well. The nanodispersion may also be formed by blending an aqueous based continuous phase and nanoparticles. Any aqueous base may be employed. Further, the nanoparticles may be dispersed in an organic solvent as a non-aqueous dispersion.

The concentration of nanoparticles can be sufficient to provide the desired viscosity, such as concentrations greater than 0.5% by weight based on the total weight of the nano-dispersion fluid. Any suitable additional ingredients can also be added.

The hydrophobic and/or oleophobic surface modifying treatment agent may be attached to the nanoparticles to render a composite that then will be pumped into the well. Alternatively, the hydrophobic and/or oleophobic surface modifying treatment agent may be pumped within a second fluid into the well after pumping of the nanoparticles. Attachment of the hydrophobic and/or oleophobic surface modifying treatment agent may then occur in-situ.

The hydrophobic and/or oleophobic surface treating agent which modifies the surface of the nanoparticles may be fluorine-free. The green chemistry created by the attachment (functionalization) of such surface modifying treating agents to the nanoparticles provides an environmentally friendly alternative from previously provided alternatives.

The surface modifying treatment agent is typically either an (i) organosilicon material, (ii) fluorinated organic acid or a reactive derivative thereof; (iii) linear or branched alkyl organic acid or a reactive derivative thereof; (iv) substituted alkyl organic acid or a reactive derivative thereof; (v) aryl or substituted aryl organic acid or a reactive derivative thereof; or (vi) a mixture of any of (i), (ii), (iii), (iv) or (v). Typically, the number average molecular weight of the organic acid is between from about 100 g/mol to about 5,000 g/mol.

In an embodiment, the surface modifying agent is an organic acid having a long chain alkyl, aryl or fluoro group. Suitable organic acids include carboxylic acids, sulfonic acids, phosphoric acids, phosphonic acids and phosphinic acids.

Exemplary carboxylic acids include those of the formula R—COOH where R is a linear or branched $C_9$-$C_{24}$, preferably $C_{12}$-$C_{21}$ hydrocarbon group or a hydroxylated derivative thereof or a $C_6$-$C_{20}$ aryl, alkylaryl or arylalkyl group. Suitable carboxylic acids include behenic acid, palmitic acid, etc. In an embodiment, the organic acid of the hydrophobic and/or oleophobic surface modifying agent has two or more carboxylic acid moieties and preferably wherein the number average molecular weight of the organic acid is between from about 80 g/mol to about 2,000 g/mol.

Suitable reactive derivatives of organic acids as referenced herein include acid chlorides such as those of the formula R'(C=O)Cl, esters such as those of the formula R'—COOR" and corresponding acid anhydrides. In an embodiment R' and R" may be a $C_1$-$C_8$ hydrocarbon group or R as defined above.

In an embodiment, the hydrophobic and/or oleophobic surface modifying agent may be an organophosphoric acid, organophosphonic acid or organophosphinic acid or a derivative thereof. The organo groups of the anchor may be monomeric or polymeric.

Examples of monomeric phosphoric acid and derivatives have the structure $(RO)_x$—P(O)—$(OR')_y$ wherein x is 1-2, y is 1-2 and x+y=3; R preferably is a radical having a total of 1-30, preferably 2-20, more preferably 6-18 carbons; R' is H, a metal such as an alkali metal, for example, sodium or potassium or lower alkyl having 1 to 4 carbons, such as methyl or ethyl. Preferably, a portion of R' is H. The organic component of the phosphoric acid (R) can be a saturated or unsaturated aliphatic group or can be an aryl or aryl-substituted moiety. At least one of the organo groups can contain terminal or omega functional groups as described below.

Examples of monomeric phosphonic acid or derivatives include compounds or mixtures of compounds having the formula:

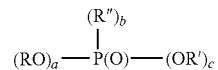

wherein a is 0-1, b is 1, c is 1-2 and a+b+c is 3; R and R" preferably are each independently a radical having a total of 1-30, preferably 2-20, more preferably 6-18 carbons; R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be a saturated or unsaturated aliphatic group or an aryl or aryl-substituted moiety. At least one of the organo groups can contain terminal or omega functional groups as described below.

Examples of monomeric phosphinic acid or derivatives are compounds or mixtures of compounds having the formula:

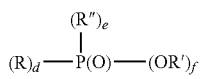

wherein d is 0-2, e is 0-2, f is 1 and d+e+f is 3; R and R" preferably are each independently radicals having a total of 1-30, preferably 2-20 carbons atoms, more preferably 6-18 carbons; R' is H, a metal, such as an alkali metal, for example, sodium or potassium or lower alkyl having 1-4 carbons, such as methyl or ethyl. Preferably a portion of R' is H. The organic component of the phosphinic acid (R, R") can be a saturated or unsaturated aliphatic group or be an aryl or aryl-substituted moiety. Examples of organo groups which may comprise R and R" include long and short chain aliphatic hydrocarbons, aromatic hydrocarbons and substituted aliphatic hydrocarbons and substituted aromatic hydrocarbons.

At least one of the organo groups can further contain one or more terminal or omega functional groups which are hydrophobic. Examples of terminal or omega functional groups include carboxyl such as carboxylic acid, hydroxyl, amino, imino, amido, thio and phosphonic acid, cyano, sulfonate, carbonate and mixed substituents.

Representative of organophosphorus acids or derivatives are amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, styrene phosphonic acid, and dodecyl bis-1,12-phosphonic acid.

In addition to monomeric organophosphorus acid and derivatives, oligomeric or polymeric organophosphorus acid derivatives resulting from self-condensation of the respective monomeric acids may be used.

The hydrophobic and/or oleophobic surface modifying treatment agent may contain fluorine. In an embodiment, the hydrophobic and/or oleophobic surface modifying treatment agent contains a fluorine containing moiety having a number average molecular weight of less than 2000. Preferred fluorinated materials are esters of perfluorinated alcohols such as the alcohols of the structure $F-(CFY-CF_2)_m-CH_2-CH_2-OH$ where Y is F or $C_nF_{2n+1}$; m is 4 to 20 and n is 1 to 6. Further preferred fluorinated materials are those of the structure $R_f-(CH_2)_p-X$ where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

In another embodiment, the organic acid of the hydrophobic and/or oleophobic surface modifying agent is a phosphoric acid, phosphonic acid, phosphinic acid or sulfonic acid having 1 to about 30 acid groups. In embodiment, the number average molecular weight of the phosphoric acid, phosphonic acid, phosphinic acid or sulfonic acid is between from about 100 g/mol to about 5,000 g/mol.

In an embodiment, the hydrophobic and/or oleophobic surface modifying agent is of the formula $R_f-(D)_p-Z$ where Z is the organic acid moiety, D is $-CH_2$ or an $(OE)_p$ group, E is a $C_1$-$C_3$ alkylene group, $R_f$ is a perfluorinated alkyl group or contains a perfluorinated alkylene ether group, particularly a perfluorinated alkyl group or perfluorinated alkylene ether group referenced herein, and p is 2 to 4.

In an embodiment, the surface modifying treatment agent may contain the moiety $R_f-(CH_2)_p-$ where $R_f$ is a perfluorinated alkyl group or contains a perfluorinated alkylene ether group and p is 2 to 4, preferably 2.

Further examples of perfluorinated groups for the fluorine containing moiety are those of the structure:

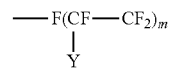

where Y is F or $C_nF_{2n+1}$; m is 4 to 20 and n is 1 to 6.

A preferred oligomeric or perfluoroalkylene ether group is where R and/or R" is a group of the structure:

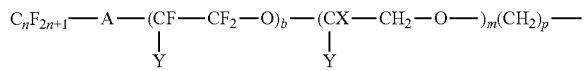

where A is an oxygen atom or a chemical unit such as $-CF_2$; n is 1 to 20, preferably 1 to 6; Y is H, F, $C_nH_{2n+1}$ or $C_nF_{2n+1}$; X is H or F; b is at least 1, preferably 2 to 10, m is 0 to 50, and p is 1 to 20.

In a preferred embodiment, the surface modifying treatment agent is of the formula $R_f-(CH_2)_p-Z$ where Z, the situs of the attachment of the treatment agent to the nanoparticle surface is H, F or an acid derivative, and the hydrophobic and/or oleophobic portion (bonded to the surface of the nanoparticle) is the $R_f-(CH_2)_p-$ moiety where $R_f$ is a perfluorinated alkyl group or contains a perfluorinated alkylene ether group referenced above and p is 2 to 4, preferably 2.

In another embodiment, the surface modifying treatment agent is of the formula $R_f-(CH_2)_p-Z$, wherein Z is:

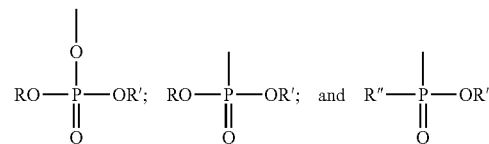

as referenced above and in a preferred embodiment where R and R" independently may be a hydrocarbon or substituted hydrocarbon radical having up to 200, such as 1 to 30 and 6 to 20 carbons, R and R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In an embodiment, the surface modifying treatment agent is of the formula $CF_3(C_nF_{2n})CH_2CH_2PO_3H_2$ where n is between 3 and 5 or $CF_3(CF_2)_xO(CF_2CF_2)_y$—$CH_2CH_2$—$PO_3H_2$ where x is from 0 to 7, y is from 1 to 20 and x+y is less than or equal to 27.

In another embodiment, the organo-silicon containing material may be a silane, polysiloxane or a polysilazane. In an embodiment, the organo-silicon containing compound may be an organo(poly)siloxane or organo(poly)silazane of molecular weight of at least 400, usually between 1000 and 5,000,000.

Examples of organo-silicon materials are alkoxysilanes as well as acidic compounds having a branched or unbranched alkyl group.

Suitable organo-silicon containing materials further include those of the formula $R^1_{4-x}SiA_x$ or $(R^1_3Si)_yB$ as well as organo(poly)siloxanes and organo(poly)silazanes containing units of the formula:

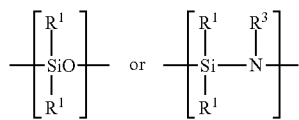

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

The substituent A in $R^1_{4-x}SiA_x$ may be hydrogen, a halogen such as chloride, OH, $OR^2$ or

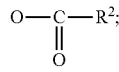

B in the formula $(R^1_3Si)_yB$ may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3 and y is 1 or 2.

Preferably, $R^1$ is a fluoro-substituted hydrocarbon. Preferred are such fluoro-substituted hydrocarbons are those of the structure:

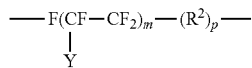

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

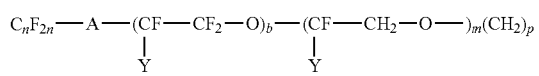

where A is an oxygen atom or a chemical unit; n is 1 to 6, Y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$:PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—$(CFY—CF_2)_m$ where Y is F or $C_nF_{2n+1}$; m is 4 to 20 and n is 1 to 6.

Examples of perfluoroalkylene ether groups are those of the structure:

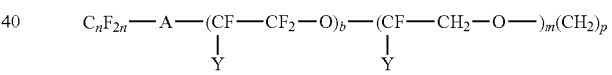

where A is an oxygen atom or a chemical unit; n is 1 to 6, Y is F or $C_nF_{2n}$; b is 2 to 20, m is 0 to 6, and p is 0 to 18, preferably 2 to 4 and more preferably 2.

The hydrophobic and/or oleophobic surface modifying treatment agent or a composition containing the surface modified nanoparticles may be pumped into the formation as a component of a well treatment fluid. The well treatment fluid may be pumped into the formation any time during the well treatment operation. The well treatment fluid may contain a diluent. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran. Also, aqueous alkaline solutions such as sodium and potassium hydroxide can be used as the diluent.

The concentration of the hydrophobic and/or oleophobic surface modifying treatment agent in the well treatment fluid or the surface modified nanoparticles, when pumped into well, is 0.01% to 100% or more typically between 0.1% to 20% (v/v).

In an embodiment, the well treatment fluid may be a fracturing fluid, pad fluid, acidizing fluid, etc. In an embodiment, the well treatment fluid may be a component of a fracturing fluid, pad fluid, acidizing fluid, etc.

The surface modified nanoparticles impede the permeability of water in water saturated zones of a producing formation without reducing relative permeability to oil or gas. Since relative permeability is dependent on the pore structure and size, wettability of the formation surface and capillary pressure of the water within the formation, in some instances, such as where the formation is characterized by larger pores, water and oil permeability may be improved. The surface modified nanoparticles are particularly effective in oil saturated sandstone formations while exhibiting the ability to decrease water permeability substantially in water saturated zones.

The surface modified nanoparticles disclosed herein may alter the surface energy of the formation being treated. The attachment of the surface modified nanoparticles onto the surface of the formation reduces the surface energy of the substrate likely by reducing the charge density on the surface.

In addition to lowering the water saturation and enhancing recovery of water from the formation surface, attachment of the surface modified nanoparticles onto the formation further may prevent spalling of fines by altering the zeta potential of formation fines. Migration of fines into producing areas of the formation is minimized and in-situ fines generation is minimized or stabilized.

Particulates of a weakly consolidated, semi consolidated or unconsolidated formation may further be consolidated by use of the surface modified nanoparticles disclosed herein. The bonding of the surface modified nanoparticles on the surface formation prevents or minimizes the influx of fluids into the formation. Aggregation of the particulates results from the reduction in charge density.

Upon being pumped into the formation, the surface modified nanoparticles may enter into the pore spaces of the formation. Multiple interactions of molecules of the surface modified nanoparticles with formation particulates causes aggregation or agglomeration of formation particulates. Further, it is believed, that the reactivity of the surface modified nanoparticles with formation surfaces or portions of formation surfaces creates an aggregation or agglomeration of the hydrophobic portion of the surface modified nanoparticles in near proximity to the formation surface. The use of the surface modified nanoparticles as a means to consolidate particulates of the formation is particularly effective in the treatment of shale formations.

In another embodiment, the swelling, dispersement, disintegration, migration and otherwise disruption of clay in oil and gas producing formations may be decreased by use of the surface modified nanoparticles and native fluid production may dislodge fines in a pore throat. The degree of swelling, as well as migration of clay particles, is often increased when formation clays are disturbed by foreign substances, such as aqueous well treatment fluids. Like fines formation, the swelling and migration of formation clays presents problems during stimulation and well completion, such as by increasing the bulk volume of treatment fluids. For instance, clays, in the presence of well treatment fluids, often expand and may be disrupted by becoming unconsolidated, thereby producing particles which migrate into a borehole. The presence of the surface modified nanoparticles prevents the swelling and migration of formation clay particles. Thus, by obstruction of formation capillaries, swelling and migration of formation clay may be reduced or prevented by the use of the surface modified nanoparticles disclosed herein. Loss of formation permeability is thus minimized to create little, if any, reduction in the flow rate of hydrocarbons.

In a preferred embodiment, the surface modified nanoparticles may be used in the treatment of a shale formation or a clay-rich formation in order to coat the surface of the formation to reduce water absorption or imbibement of water in order to reduce swelling.

The surface modified nanoparticles disclosed herein may also be used in the treatment of rich gas or retrograde condensate gas reservoirs and thus presents value to retrograde gas fields by increasing condensate production. In such reservoirs, heavy end fraction of gases may be precipitated in liquid form from solution in the gas as the reservoir pressure within the well is decreased below the dew point of the gas. Condensed liquid drains downward by gravity when its saturation exceeds the irreducible condensate saturation. With retrograde gases, liquids cannot be reabsorbed into the gas phase even if pressure is increased by a rate reduction. When a well treatment fluid containing the surface modified nanoparticles disclosed herein is pumped into a retrograde gas well, the permeability of the formation may be maintained, and condensate dropout minimized. Thus, in turn, minimizes the possibility of the formation of an emulsion between precipitated hydrocarbons and the invading water from the aqueous based well treatment fluid. The pressure below the dew point of the hydrocarbons may therefore be maintained. By enhancing the permeability of the formation to liquid hydrocarbons, loss of light condensate liquids is minimized and light condensate liquids may therefore be more readily displaced.

The surface modified nanoparticles disclosed herein may also be used to enhance load recovery of water. The hydrophobic nature of the surface modified nanoparticles provides increased recovery of flowback water from the well after fracturing fluid has been returned to the surface. In some instances, flowback water may be as low as 25%, while in some cases can be as high as 75%, of the volume of fluid that was injected into the well. This application is particularly useful in shale fractures having a complex of narrow fractures with limited conductivity where a low range of fluid recovery values (30% or less) are typically experienced. This lack of recovery is often interpreted as causing formation damage (from residual polymer gels residues), resulting in lowered gas/oil production. Methods as described in this disclosure that results in increased water recovered from the shale-type formation can thus be interpreted to reduce formation damage, and hence improve well productivity. For instance, in a typical fracturing job on a Marcellus shale formation, 20,000 to 150,000 barrels of fracturing fluid may be pumped into the well, depending upon the number of stages pumped.

The hydrophobic nature of the surface modified nanoparticles may further serve to control water condensation in the pores of a near wellbore region of a permeable formation. Often, the liquid zone formed from the condensation of hydrocarbons within a gas reservoir close to the wellbore hampers gas flow, reducing the productivity of the well the formation of "water block" or "water bank" zones. Condensation of water in the pores of a near wellbore region of a permeable formation may be decreased by the presence of the surface modifying treatment agent. Fluid transfer and water flux through the pores of the near wellbore region of the formation may be controlled by inhibiting the formation of a water bank by the surface modified nanoparticles.

In another embodiment, the surface modified nanoparticles may be used in an acidizing operation in order to increase the penetration of acid into the formation. Since the surface modified nanoparticles are either on or in close proximity to the formation face, reaction of acid with the formation surface may be retarded. The reactive acid may therefore etch the formation in more distant areas from the port of entry of the treatment fluid. Deeper acid penetration in the well may therefore result.

Further, the surface modified nanoparticles may be used to shut-off water into a formation. In this regard, the surface modifying treatment agent finds particular applicability in the treatment of matrix formations having finer grained particles between larger rock particles or finer grained particles in which the larger particles are embedded. The hydrophobic nature of surface modified nanoparticles reduces the influx of water into matrix formations characterized by low permeability. Further, matrix formations produce a large amount of water due to an influx of water into the wellbore. Over time, the amount or percentage of produced water may increase resulting in a corresponding decrease in the production of desired hydrocarbons, eventually rendering further production of hydrocarbons from the well uneconomical. The flow of water into the formation is blocked or otherwise abated. This results in increased rates in hydrocarbon production and ultimately increases recoverable reserves.

In an embodiment, the surface modified nanoparticles may function as a passive anti-microbial agent in order to counter bacterial growth principally caused by nitrogen and/or phosphorus in formation water or within fluid injected into the formation. The surface modified nanoparticles may repel the fluid from the formation and thus decrease contact time of the fluid in the formation. This prevents the build-up of aerobic bacteria, anaerobic bacteria and other microbials.

In another embodiment, the surface modified nanoparticles may be used to passively inhibit, control, prevent or remove scale deposition onto or within the formation. The hydrophobic nature of the surface modified nanoparticles minimizes or decreases the ability of such materials to adhere to the formation. This may be attributable to the hydrophobic nature of such mineral scales as calcium, barium, magnesium salts and the like including barium sulfate, calcium sulfate, and calcium carbonate scales. The surface modified nanoparticles may further have applicability in the treatment of other inorganic scales, such as metal sulfide scales, like zinc sulfide, iron sulfide, etc. Since such scales tend to plug the pore spaces and reduce the porosity and permeability of the formation, the surface modified nanoparticles described herein improve the permeability of the formation.

When coated onto the substrate of the formation being treated, the bulky nature of the hydrocarbon tail of the surface modifying treatment agent prevents or controls deposition of organic particulates onto the formation substrate, fines are returned to the surface with the fluid. In addition, bonding of the metal of the surface modifying treatment agent onto the formation minimizes binding sites for such organic particulates. Thus, the surface modifying treatment agents may be used to control or prevent the deposition of organic materials (such as paraffins and/or asphaltenes) within or onto the formation. Such solids and particulates are known to negatively impact the overall efficiency of completion of wells and, like scale inhibitors, can precipitate from produced water and create blockages in flow paths within the formation. The formation and deposition of such unwanted contaminants decrease permeability of the subterranean formation, reduce well productivity, and, in some cases, may completely block well tubing.

In addition, at least a portion of a tool or pipe exposed to hydrocarbons during the production of the hydrocarbons from the subterranean formation may be coated with the surface modified nanoparticles. Typically, the tool or pipe is coated with the surface modified nanoparticles prior to introducing the tool or pipe into the well.

EXAMPLES

Example 1

Glass slides (having a hydroxyl group on their surface) were used to determine changes in wettability. The surface of the glass slides was etched with an organic acid to better simulate a sandstone matrix and to demonstrate changes in wettability of the sandstone. The glass slide was extremely hydrophilic, the contact angle of water on the etched glass slide was about 20°.

After being rinsed with water, another of the glass slides was immersed into a solution containing a hydrophobic/oleophobic (perfluoroalkyl)alkoxysilane. The solution was maintained at 60° C. for couple of hours to render a silane coating on the nanoparticle coated glass slides. After drying, the contact angle was determined to be 110° (hydrophobic).

Another of the glass slides was rinsed with water and then immersed into a nanoparticle dispersion. Catapal 200 alumina boehmite nanoparticles (size 20 nm) were dispersed in water using sonication and mixers to provide a 0.1% to 1% dispersion. The glass slide was then inserted into the dispersion and maintained at 60° C. During this time the hydroxyl group on the surface of the glass slides reacted with the functional group present on the surface of the nanoparticle to render nanoparticle coated glass slides. The nanoparticle coated glass slides were superhydrophilic and the contact angle was not measurable since the water spread too quickly. Application of the nanoparticles and the low energy surface groups created surface roughness to the glass slide.

The glass slide was then immersed into a solution containing a hydrophobic (perfluoroalkyl)alkoxysilane and functionalized. The solution was maintained at 60° C. for couple of hours to render a silane coating on the nanoparticle coated glass slides. The wettability of the glass slide was noted as changing from hydrophilic to hydrophobic due to the presence of the low energy fluoroalkyl silane groups on the surface of the glass slide. After drying, the contact angle was determined to be 105° (hydrophobic). This demonstrates that the surface of the slide (sandstone) changed from being hydrophilic to hydrophobic.

Example 2

Silica nanoparticles were synthesized by a sol-gel process from tetraethyl orthosilicate and 3-aminopropyltriethoxysilane. The nanoparticle sol was further treated with an alkoxysilane containing hydrophobic groups at 40° C. The sol was then coated onto the etched glass while the temperature was maintained at 60° C. After drying, the contact angle was measured at 110°. The wettability of the glass slide was noted as changing from hydrophilic to hydrophobic due to the presence of the low energy fluoroalkyl silane groups on the surface of the etched glass slide. This mimics superhydrophobicity in a sandstone formation, created by surface roughness of the surface of the formation by the nanoparticles and the low energy surface groups of the low energy surface groups. The contact angle of the glass slide coated with the fluoroalkyl silane functionalized silica particles was measured as 148° (well within the range known to be characteristic of superhydrophobic). The increase in contact angle (versus that illustrated in Example 1) was likely due to greater roughness caused by nanoparticle coating and the functional group present on the surface of nanoparticles Example 3

Example 2 was repeated except a mineral oil was coated on the glass surface prior to the introduction of the sol. The contact angle of mineral oil on the coated glass surface (after an ethanol wash) was recorded as 81°.

Example 4

The silica nanoparticles of Example 2 were treated with a perfluorosilane/polysiloxane mixture at 40° C. The sol was then coated onto the etched glass while the temperature was maintained at 60° C. The contact angle on the coated glass surface (after an ethanol wash) was 106°.

The silica nanoparticles of Example 2 were then treated with a blend of the (fluoro)alkoxysilane and a silane/polysiloxane mixture. The blend provided a greater number of hydroxyl groups for the nanoparticles to bond to the hydroxyl groups on the glass surface. The bifunctional surface modifying agent improves chemical bonding and adhesion of the nanoparticles to the surface of the glass as well as to the nanoparticles. This provides a superhydrophobic coating on the glass. The coated slide was washed with flowing tap water and then with ethanol solution. The contact angle after washing with water was 150°. After washing with ethanol, the contact angle was 147°. The bifunctional surface modifying agent provides little change in the contact angle while improving adhesion. Blending with commercial formulations thus increases adhesion of the coating to the glass surface.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of imparting hydrophobicity and/or oleophobicity to a surface of a subterranean formation during production of hydrocarbons from the subterranean formation comprising exposing the surface of the subterranean formation to surface modified nanoparticles which comprise a substrate of nanoparticles and a hydrophobic and/or oleophobic surface modifying agent attached onto surfaces of the nanoparticles wherein at least a portion of the nanoparticles are attached to the surface of the subterranean formation and further wherein (a) the diameter of the substrate of the nanoparticles is less than or equal to 100 nm and the nanoparticles are selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof; and (b) the hydrophobic and/or oleophobic surface modifying agent is selected from the group consisting of (i) organosilicon materials; (ii) fluorinated organic acids or reactive derivatives thereof; (iii) linear or branched alkyl organic acids or reactive derivatives thereof; (iv) substituted alkyl organic acids or reactive derivatives thereof; (v) aryl or substituted aryl organic acids or reactive derivatives thereof; and (vi) mixtures of (i), (ii), (iii), (iv) and/or (v).

2. The method of claim 1, wherein the hydrophobic and/or oleophobic surface modifying agent is covalently bonded onto at least a portion of the nanoparticles.

3. The method of claim 1, wherein the hydrophobic and/or oleophobic surface modifying agent is (ii), (iii), (iv) or (v) and wherein the organic acid is selected from the group consisting of carboxylic acids, phosphonic acids, phosphoric acids, phosphinic acids, sulfonic acids and mixtures thereof.

4. The method of claim 3, wherein the hydrophobic and/or oleophobic surface treating agent contains:
(a) a derivative of a phosphoric acid having the structure $(RO)_x$—P(O)—$(OR')_y$;
(b) a derivative of a phosphonic acid of the structure:

and
(c) a derivative of a phosphinic acid of the structure:

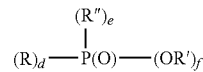

wherein:
R and R" are each independently a radical having a total of 1 to 30 carbon atoms, optionally substituted with a perfluorinated alkyl group or a perfluorinated alkylene ether group;
R' is H, a metal or a lower alkyl having from 1 to 4 carbon atoms;
x is 1 to 2; y is 1 to 2; x+y=3;
a is 0-1;
b is 1;
c is 1-2;
a+b+c is 3;
d is 0-2;
e is 0-2;
f is 1; and
d+e+f is 3.

5. The method of claim 1, wherein the organic acid:
(i) contains a fluorine containing moiety;
(ii) is a carboxylic acid of the formula R—COOH where R is a linear or branched $C_9$-$C_{24}$ hydrocarbon group or a hydroxylated derivative thereof or a $C_6$-$C_{20}$ aryl, alkylaryl or arylalkyl group; or
(iii) has two or more carboxylic acid moieties.

6. The method of claim 5, wherein the organic acid contains a fluorine containing moiety of:
(a) $R_f$—$(CH_2)_p$— where $R_f$ is a perfluorinated alkyl group or contains a perfluorinated alkylene ether group and p is 2 to 4;

(b)

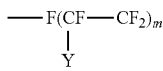

where Y is F or $C_nF_{2n+1}$; m is 4 to 20 and n is 1 to 6; or
(c) an oligomeric or perfluoroalkylene ether group of the structure:

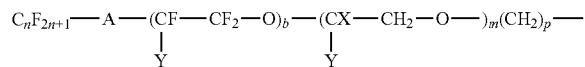

where A is an oxygen atom or $CF_2$; n is 1 to 20; Y is H, F, $C_nH_{2n+1}$ or $C_nF_{2n+1}$; X is H or F; b is at least 1, m is 0 to 50, and p is 1 to 20.

7. The method of claim 1, wherein the hydrophobic and/or oleophobic surface modifying agent is of the formula $R_f$—$(CH_2)_p$—Z, wherein Z is:

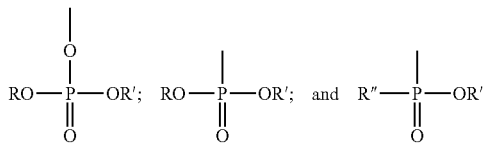

where R and R″ are a hydrocarbon or substituted hydrocarbon radical having up to 200 carbons or R and R″ is a perfluoroalkyl group, and R' is H or an aliphatic radical having from about 1 to about 50 carbon atoms or a substituted or unsubstituted aryl group having 6 to about 50 carbons.

8. The method of claim 1, wherein the organo-silicon material is a silane, polysiloxane or a polysilazane.

9. The method of claim 1, wherein the organo-silicon material has a formula selected from:

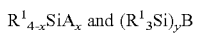

or an organo(poly)siloxane or organo(poly)silazane of the formula:

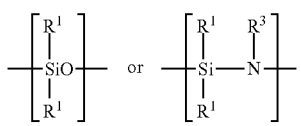

where:
R¹ are identical or different and are a hydrocarbon or substituted hydrocarbon radical containing from 1 to 100 carbon atoms;
A is hydrogen, halogen, OH, OR² or

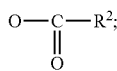

B is $NR^3_{3-y}$;
R² is a hydrocarbon or substituted hydrocarbon radical containing from 1 to 12 carbon atoms;

R³ is hydrogen or R¹;
x is 1, 2 or 3; and
y is 1 or 2.

10. The method of claim 1, wherein the surface modified nanoparticles are prepared by (i) adding the hydrophobic and/or oleophobic surface modifying agent to a dispersion containing the nanoparticles as dispersants in a solvent, the nanoparticles having a charge resulting in a Zeta potential in the dispersion; (ii) removing the solvent from the dispersion; and then (iii) drying the product of step (ii).

11. The method of claim 10, wherein at least one of the following conditions is true:
(a) the nanoparticle dispersants have a particle size between from about 90 nm to about 225 nm;
(b) the nanoparticles are pre-treated with an acid prior to dispersing the nanoparticles in the dispersion; or
(c) the nanoparticles have a diameter of crystallized size, prior to being dispersed in the dispersion, of 100 nm or less.

12. The method of claim 1, wherein the nanoparticles are first attached to the surface of the subterranean formation by pumping into a well penetrating the subterranean formation a first fluid containing the nanoparticles; and (b) the hydrophobic and/or oleophobic surface treating agent is attached to surfaces of the nanoparticles by pumping into the well a second fluid containing the hydrophobic and/or oleophobic surface treating agent, thereby forming the surface modified nanoparticles.

13. The method of claim 1, wherein the contact angle between the surface modified nanoparticles attached to the formation and aqueous formation fluid is greater than or equal to 105° and further wherein the contact angle between the surface modified nanoparticles attached to the formation and hydrocarbon formation fluid is greater than or equal to 60°.

14. The method of claim 1, wherein at least one of the following conditions prevail:
(i) the surface of the subterranean formation is more rough after the surface modified nanoparticles are attached to the surface than before the surface modified nanoparticles are attached to the surface; or
(ii) the surface tension of the surface of the subterranean formation is less after the surface modified nanoparticles are attached to the surface than before the surface modified nanoparticles are attached to the surface.

15. The method of claim 1, wherein at least one of the following conditions prevail:
(a) the surface modified nanoparticles alter the surface energy of the formation;
(b) the surface modified nanoparticles reduce water saturation on the surface of the subterranean formation exposed to hydrocarbons during the production of the hydrocarbons from the subterranean formation;
(c) the surface modified nanoparticles alter the wettability of the surface of the subterranean formation exposed to hydrocarbons during the production of hydrocarbons from the subterranean formation;
(d) the surface modified nanoparticles alter the wettability of the surface of the formation to be neutrally wet;
(e) the surface modified nanoparticles stabilize fines in the subterranean formation;
(f) the hydrocarbons are produced in a producing well and the surface modified nanoparticles decrease the amount of formation solids flowed back from the surface of the subterranean formation into the producing well;
(g) the surface modified nanoparticles are passive antimicrobial agents and minimize or prevent the retention of water on the surface of the subterranean formation;

(h) the surface modified nanoparticles passively inhibit or control scale deposition onto or within the subterranean formation;

(i) the surface modified nanoparticles passively prevent or control deposition of organic particulates onto or within the surface of the subterranean formation;

(j) the surface modified nanoparticles decrease swelling of clay within the subterranean formation;

(k) the surface modified nanoparticles increase relative permeability of the formation to oil/gas with respect to water, thus preventing water banking behind the formation surface;

(l) the hydrocarbons are produced in a retrograde condensate gas reservoir and the surface modified nanoparticles minimize condensation within the reservoir while maintaining the permeability of the reservoir;

(m) the hydrocarbons are produced in a gas or oil well and the surface modified nanoparticles enhance the amount of flowback water and produced water from the well following completion of a well treatment operation;

(n) the surface modified nanoparticles are within a pad fluid pumped into the well prior to step (a);

(o) the fluid containing the nanoparticles is pumped into the well at a pressure sufficient to create or enlarge a fracture in the subterranean formation;

(p) the surface modified nanoparticles control water condensation in the pores of the near wellbore region of the subterranean formation;

(q) the subterranean formation is a tar sand formation and the surface modified nanoparticles enhance the recovery of hydrocarbons from deposits within the tar sand;

(r) the subterranean formation is subjected to acidizing and the surface modified nanoparticles increase penetration of acid into the formation;

(s) the subterranean formation is a matrix formation and the surface modified nanoparticles reduce influx of water into the formation; or (t) at least a portion of a tool or pipe exposed to hydrocarbons during the production of the hydrocarbons is coated with the surface modified nanoparticles.

16. A method of altering the wettability of a surface of a subterranean formation exposed to hydrocarbons during production of hydrocarbons from the subterranean formation, the method comprising attaching nanoparticles to the surface of the subterranean formation wherein the nanoparticles have a crystallized size less than or equal to 100 nm and surfaces of the nanoparticles are modified with a hydrophobic and/or oleophobic surface modifying treatment agent attached thereto, the surface modifying treatment agent comprising (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; (v) aryl or substituted aryl organic acids and reactive derivatives thereof; and (vi) mixtures thereof; and further wherein the surface of the subterranean formation is exposed to the surface modified nanoparticles for a period of time sufficient to render the surface of the subterranean formation neutrally wet.

17. The method of claim 16, wherein the nanoparticles are first attached to the surface of the subterranean formation by pumping into the well a first fluid containing the nanoparticles; and (b) the hydrophobic and/or oleophobic surface treating agent is attached to the nanoparticles by pumping into the well a second fluid containing the hydrophobic and/or oleophobic surface treating agent, thereby forming the surface modified nanoparticles.

18. The method of claim 16, wherein at least one of the following conditions prevail:
(i) the contact angle between the surface modified nanoparticles attached to the formation and aqueous formation fluid is greater than or equal to 105° and the contact angle between the surface modified nanoparticles attached to the formation and hydrocarbon formation fluid is greater than or equal to 60°;
(ii) the surface of the subterranean formation is more rough after the surface modified nanoparticles are attached to the surface than before the surface modified nanoparticles are attached to the surface; or
(iii) surface tension of the surface of the subterranean formation is less after the surface modified nanoparticles are attached to the surface than before the surface modified nanoparticles are attached to the surface.

19. A method of treating a subterranean formation penetrated by a well comprising:
(a) pumping into the well a fluid comprising nanoparticles and attaching the nanoparticles to a surface of the subterranean formation, wherein the nanoparticles are selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof and further wherein the crystallized size of the nanoparticles is less than or equal to 100 nm;
(b) pumping into the well a fluid comprising a hydrophobic and/or oleophobic surface modifying agent selected from the group consisting of (i) organosilicon materials; (ii) fluorinated organic acids and reactive derivatives thereof; (iii) linear or branched alkyl organic acids and reactive derivatives thereof; (iv) substituted alkyl organic acids and reactive derivatives thereof; (v) aryl or substituted aryl organic acids and reactive derivatives; and (vi) mixtures of (i), (ii), (iii), (iv) and/or (v); and
(c) coating the surface modifying agent onto at least a portion of the surface of the nanoparticles to form surface modified nanoparticles.

20. The method of claim 19, wherein the contact angle between the surface modified nanoparticles attached to the formation and aqueous formation fluid is greater than or equal to 105° and further wherein the contact angle between the surface modified nanoparticles attached to the formation and hydrocarbon formation fluid is greater than or equal to 60°.

* * * * *